(12) United States Patent
Sato

(10) Patent No.: US 10,479,308 B2
(45) Date of Patent: Nov. 19, 2019

(54) DAMPING MEMBER FOR VEHICLE

(71) Applicant: KASAI KOGYO CO., LTD., Kanagawa (JP)

(72) Inventor: Naotoshi Sato, Chigasaki (JP)

(73) Assignee: KASAI KOGYO CO., LTD., Koza-Gun, Kanagawa (JP)

( * ) Notice: Subject to any disclaimer, the term of this patent is extended or adjusted under 35 U.S.C. 154(b) by 140 days.

(21) Appl. No.: 15/762,161

(22) PCT Filed: Feb. 10, 2016

(86) PCT No.: PCT/JP2016/000701
§ 371 (c)(1),
(2) Date: Mar. 22, 2018

(87) PCT Pub. No.: WO2017/138039
PCT Pub. Date: Aug. 17, 2017

(65) Prior Publication Data
US 2018/0272980 A1 Sep. 27, 2018

(51) Int. Cl.
*B60R 21/04* (2006.01)
*B60R 13/02* (2006.01)

(52) U.S. Cl.
CPC .............. *B60R 21/04* (2013.01); *B60R 13/02* (2013.01); *B60R 2013/0287* (2013.01); *B60R 2021/0414* (2013.01)

(58) Field of Classification Search
CPC . B60R 21/04; B60R 13/02; B60R 2013/0287; B60R 2021/0414
See application file for complete search history.

(56) References Cited

U.S. PATENT DOCUMENTS 5,573,272 A * 11/1996 Teshima .............. B60R 21/0428
280/751
5,857,702 A * 1/1999 Suga ...................... B60J 5/0451
280/751
5,934,730 A 8/1999 Yagishita et al.
(Continued)

FOREIGN PATENT DOCUMENTS

EP 388952 A1 1/1999
JP H07-031432 U 6/1995
(Continued)

OTHER PUBLICATIONS

International Search Report for International Application No. PCT/JP2016/000701 dated May 10, 2016, Japan.

*Primary Examiner* — Drew J Brown
(74) *Attorney, Agent, or Firm* — United IP Counselors, LLC

(57) ABSTRACT

Provided is a damping member for a vehicle having excellent efficiency of input energy absorption. A damping pad serving as a damping member for a vehicle includes a base plate portion having a flat plate shape, a vertical wall arranged at a rim of the base plate portion in a flange-like manner, a plurality of ribs arranged in parallel as rising from the base plate portion, each of the ribs connected to a vertical wall as extending in a direction intersecting with the vertical wall, and a fragile section arranged between adjacent two of the ribs. The fragile section includes a groove formed at the vertical wall and a slit formed at the base plate portion.

3 Claims, 4 Drawing Sheets

(56) References Cited

U.S. PATENT DOCUMENTS

| | | | |
|---|---|---|---|
| 6,036,251 A | | 3/2000 | Yagishita et al. |
| 7,997,637 B2* | | 8/2011 | Suzuki ................ B60R 21/0428 |
| | | | 296/146.7 |
| 8,029,041 B2* | | 10/2011 | Hall ....................... B60J 5/0451 |
| | | | 296/146.6 |
| 8,152,218 B2* | | 4/2012 | Hall ....................... B60J 5/0452 |
| | | | 296/146.6 |
| 8,454,053 B2* | | 6/2013 | Sun .................... B60R 21/0428 |
| | | | 280/751 |
| 8,678,460 B2* | | 3/2014 | Stachura ................. B60R 13/02 |
| | | | 248/27.3 |
| 8,905,444 B2* | | 12/2014 | Zannier ................... F16F 7/121 |
| | | | 293/132 |
| 8,960,774 B2* | | 2/2015 | Sakhare ................ B62D 25/02 |
| | | | 280/748 |

FOREIGN PATENT DOCUMENTS

| | | | |
|---|---|---|---|
| JP | H08-11542 A | 1/1996 |
| JP | H08-132874 A | 5/1996 |
| JP | H11-070886 A | 3/1999 |
| JP | 2002-331896 A | 11/2002 |
| JP | 2004-217107 A | 8/2004 |
| JP | 2009-241692 A | 10/2009 |
| JP | 2013-237406 A | 11/2013 |

* cited by examiner

DAMPING MEMBER FOR VEHICLE

CROSS-REFERENCE TO RELATED APPLICATIONS

This application is a National Stage Entry application of PCT International Application No. PCT/JP2016/000701, filed on Feb. 10, 2016, the entire contents of which are hereby incorporated by reference.

BACKGROUND

1. Technical Field

The present invention relates to a damping member for a vehicle.

2. Description of the Background

Conventionally, there has been known a structure to arrange a damping member (for a vehicle) in a space section between a vehicle body panel and a trim member as a countermeasure for a case that a load is applied to the trim member from a vehicle interior side or that a load is applied to the vehicle panel from the outside of the vehicle. For example, Japanese Patent Application Laid-open No. 2004-217107 discloses a structure to absorb collision energy by the damping member deformed by crush between the vehicle body panel and the trim member. The damping member is configured such that a plurality of ribs are arranged as intersecting with one another at right angles as rising from a base plate having a flat plate shape.

Further, Japanese Patent Application Laid-open No. 2013-237406 discloses a structure such that a plurality of reinforcing ribs are arranged to project in a predetermined range on a back face side of a panel body of a vehicle body panel. In this structure, the plurality of reinforcing ribs form a plurality of honeycomb structures as intersecting with one another.

BRIEF SUMMARY

In the case that a space section between a vehicle body panel and a trim member is narrow as such a roof portion of an automobile, height of a damping member (i.e., length of ribs in a rising direction) is set small as well. Therefore, stiffness of the damping member is increased and cracking and crushing are less likely to occur at the ribs. Accordingly, there has been a problem of decreasing in efficiency of input energy absorption.

Further, since a crush state of the damping member is difficult to control, the ribs (vertical walls) located at a rim on a base plate and ribs located at the inner side of the vertical walls are overlapped, causing a problem that uncrushed sections remain at the damping member. Thus, there has been a problem of decreasing in efficiency of input energy absorption.

In view of the above, an object of the present disclosure is to provide a damping member for a vehicle having excellent efficiency of input energy absorption.

To solve the abovementioned problem, the present disclosure provides a damping member for a vehicle arranged at a back face of a trim member attached to cover a vehicle body panel, and configured to absorb input energy of an input load and deformed by crush, the damping member for a vehicle comprising:

a base plate portion having a flat plate shape;
a vertical wall arranged at a rim of the base plate portion in a flange-like manner;
a plurality of ribs arranged in parallel as rising from the base plate portion, each of the ribs connected to the vertical wall as extending in a direction intersecting with the vertical wall; and
a fragile section having strength of the vertical wall locally reduced, the fragile section arranged between adjacent two of the ribs, the fragile section including, a groove formed at the vertical wall, and a slit formed at the base plate portion.

In the present embodiment, it is preferable that the groove includes,
a first groove formed at a leading end part of the vertical wall, the first groove extending in a thickness direction of the vertical wall, and
a second groove communicating with the first groove, the second groove extending in a height direction of the vertical wall, and
the slit has an opening shape elongated along an extending direction of the vertical wall, the slit being in contact with the vertical wall.

Further, in the present embodiment, it is preferable that the base plate portion has an approximately rectangular shape having longer side in a vehicle lateral direction,
the vertical wall is arranged at the entire rim of the base plate portion, and
the vertical wall has partially cut out portions at four corners of the base plate portion.

According to the present embodiment, since the grooves are formed at the vertical wall, when a load is applied, cracks occur at the vertical wall as being triggered by the fragile grooves. Further, since slits are arranged at the base plate portion to separate the base end parts of the vertical wall from the base plate portion, fissures are apt to occur along the height direction of the vertical wall and occurrence of cracks is facilitated. Accordingly, crushing of the vertical wall occurs tidily and input energy may be absorbed efficiently.

DETAILED DESCRIPTION

Figure 1:
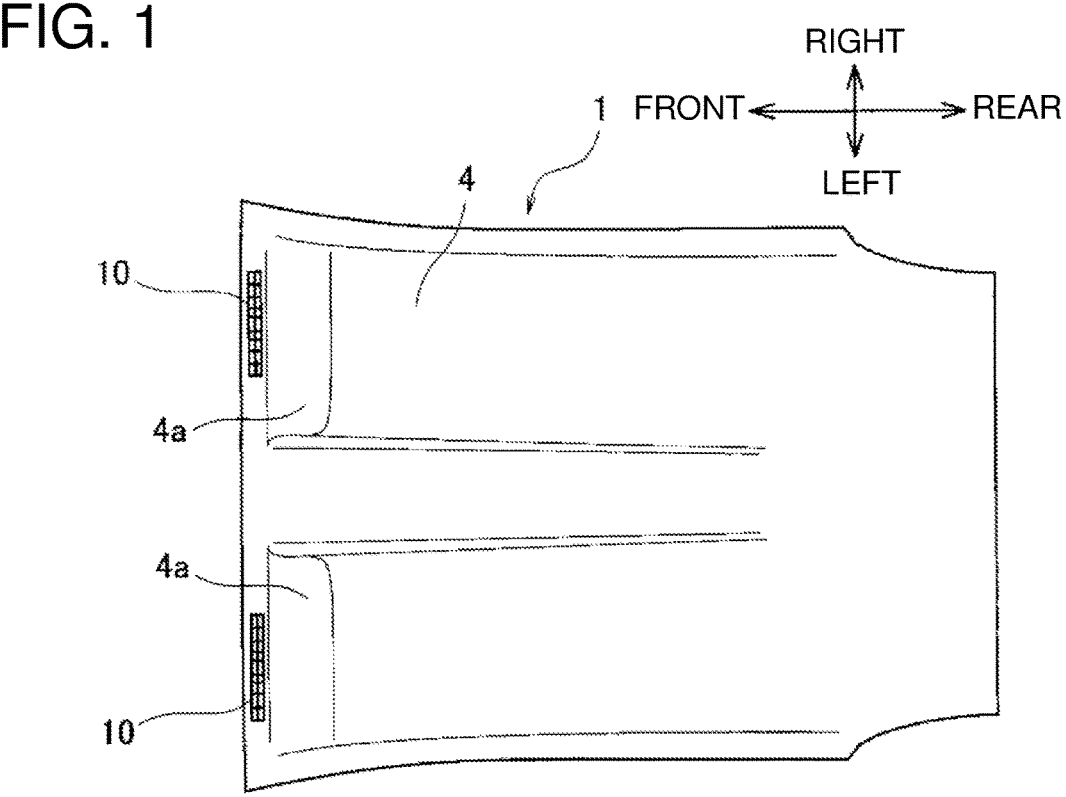
FIG. 1 is a plane view schematically illustrating a roof trim in an example to which a damping pad of the present embodiment is adapted to a roof portion.
Figure 2:
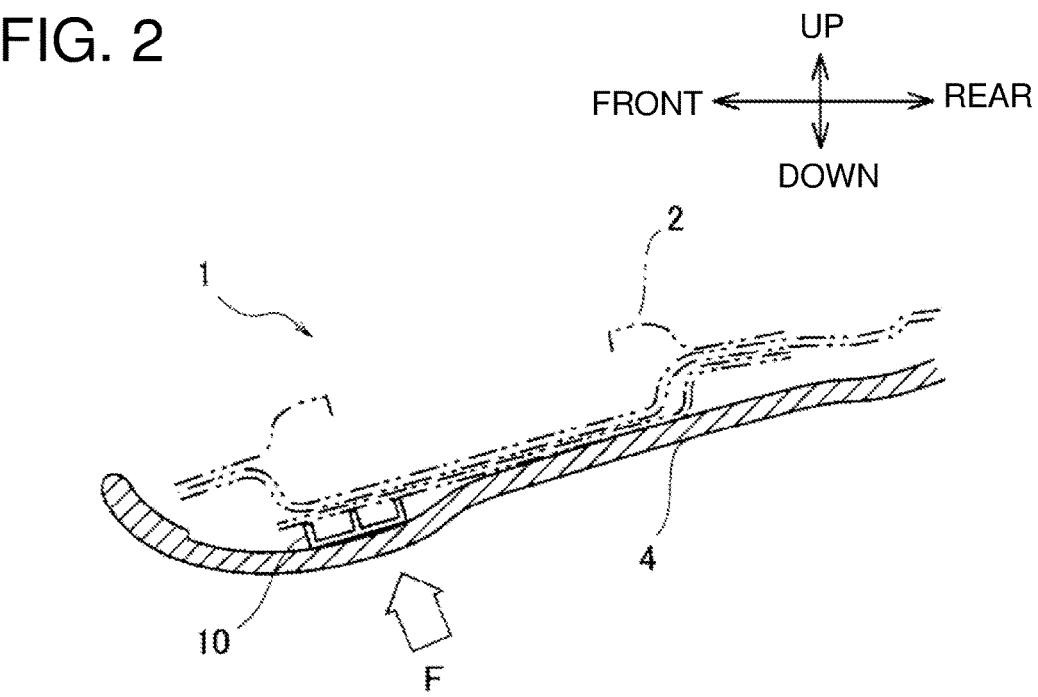
FIG. 2 is a sectional view schematically illustrating a main part of the roof portion.
Figure 3:
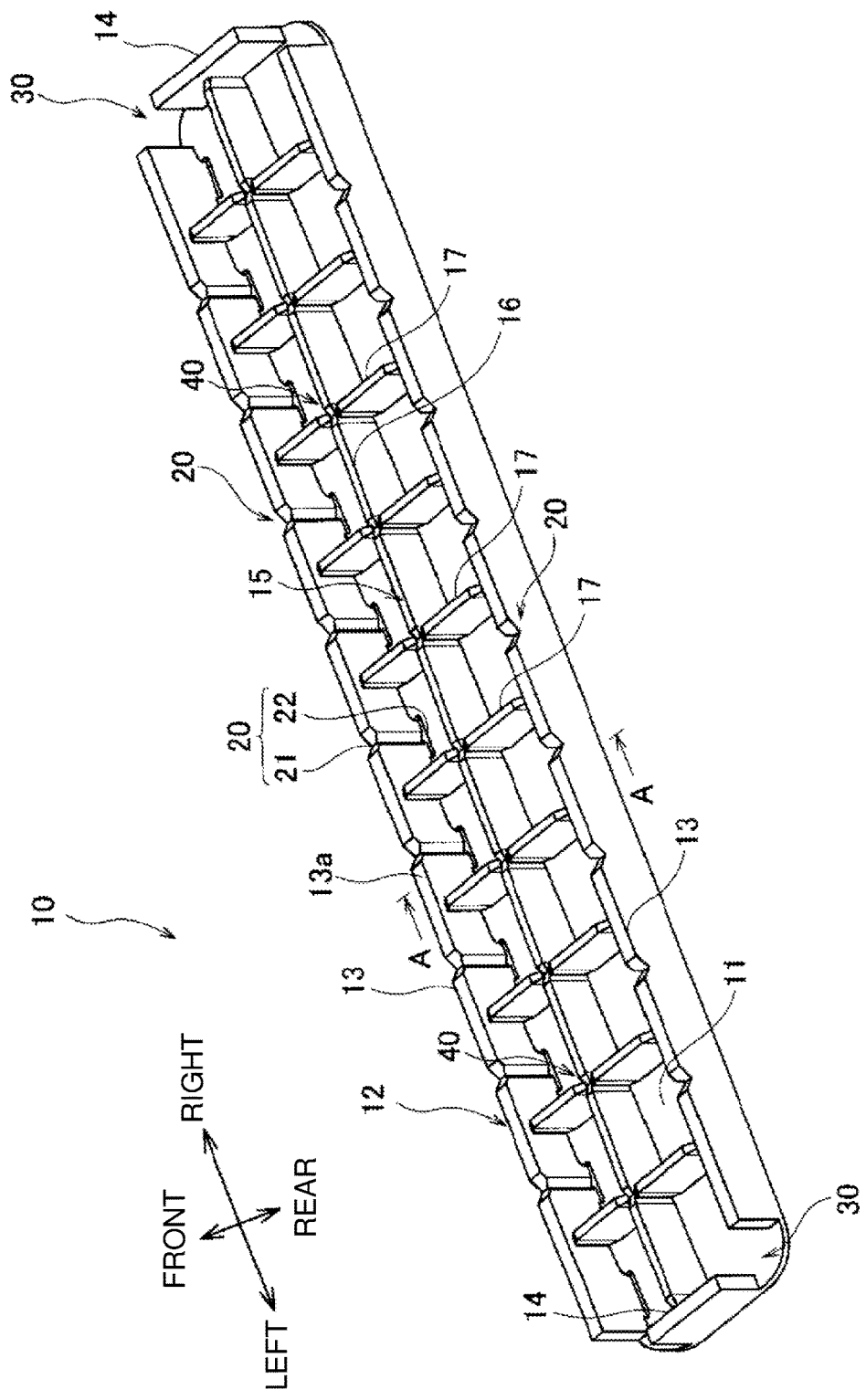
FIG. 3 is a perspective view schematically illustrating the damping pad.

In the following, a damping pad 10, that is, a damping member for a vehicle according to the present embodiment, will be described on a case that the damping pad 10 is applied to a roof portion 1 of an automobile. FIG. 1 is a plane view schematically illustrating a roof trim 4 in which the damping pad 10 of the present embodiment is applied to the roof portion 1. FIG. 2 is a sectional view schematically illustrating a main part of the roof portion 1. FIG. 3 is a perspective view schematically illustrating the damping pad 10.

The roof portion 1 includes a roof panel 2 as a vehicle body panel. A roof trim 4 is mounted on an inner face side of the roof panel 2 in proximity to the roof panel 2.

For example, the roof trim 4 is configured as a layered body including a foamed sheet with an appropriate thickness, a reinforcing sheet that ensures stiffness as being layered on each side face of the foamed sheet, and a cover material serving as a design surface exposed to a vehicle interior. According to such a layered body structure, the roof trim 4 is provided appropriately with a cushioning property, a heat insulating property, and an acoustic property.

The damping pad 10 having a high shock absorbing property is arranged at a required position of the roof trim 4, for example, as a position on the front side of a storage portion 4a for storing a sun visor (not illustrated).

The damping pad 10 absorbs input energy by receiving an input load F applied to the roof trim 4, and thus is deformed by crush. The shock absorbing property of the damping pad 10 to the input energy is unambiguously defined by a deformation stroke and a deformation reaction force in a height direction of the damping pad 10 (i.e., a rising direction of a vertical wall 12 and ribs 15 described below).

The damping pad 10 includes a base plate portion 11, the vertical wall 12, and the ribs 15 and is integrally formed of an appropriate synthetic resin material (e.g., thermoplastic resin or the like) with molding.

The base plate portion 11 is a flat-plate-shaped base member. In the present embodiment, the base plate portion 11 has an approximately rectangular shape having longer side length in a vehicle lateral direction than side length in a vehicle longitudinal direction. Here, other than the shape straightly formed along the vehicle lateral direction, the base plate portion 11 may be appropriately modified in shape in accordance with vehicle design of a panel member. For example, the base plate portion 11 may have an arc shape along the vehicle lateral direction.

The vertical wall 12 is a member (rib) continuously arranged at a rim of the base plate portion 11 in a flange-like manner. In the present embodiment, the vertical wall 12 is arranged at the entire rim of the base plate portion 11 and includes a pair of first vertical walls 13 extending in the vehicle lateral direction and a pair of second vertical walls 14 extending in the vehicle longitudinal direction. The damping pad 10 is arranged in a narrow space section between the roof panel 2 and the roof trim 4, so that height of the vertical wall 12 is set in a range approximately between 4 mm to 7 mm.

The ribs 15 are arranged in a range surrounded by the vertical wall 12 as rising from the base plate portion 11. The ribs 15 include a rib 16 (hereinafter, called a first rib as needed) extending in the vehicle lateral direction and a plurality of ribs 17 (hereinafter, called second ribs as needed) extending in the vehicle longitudinal direction. The ribs 16, 17 are arranged in a lattice-shaped manner. In the example illustrated in the present embodiment, the first rib 16 intersects with the plurality of second ribs 17 at right angles. Height of each of the ribs 16, 17 is set in accordance with the height of the vertical wall 12.

In the present embodiment, both the height of the vertical wall 12 and the height of the ribs 15 are set constant in the vehicle lateral direction. However, those may be varied appropriately in accordance with the shape of the space section. For example, the vertical wall 12 and the ribs 15 may be formed to have height gradually increasing in the vehicle lateral direction.

The damping pad 10 having the abovementioned configuration includes three kinds of fragile sections 20, 30, 40 where strength of the vertical wall 12 or the ribs 15 is locally reduced.

Figure 4:
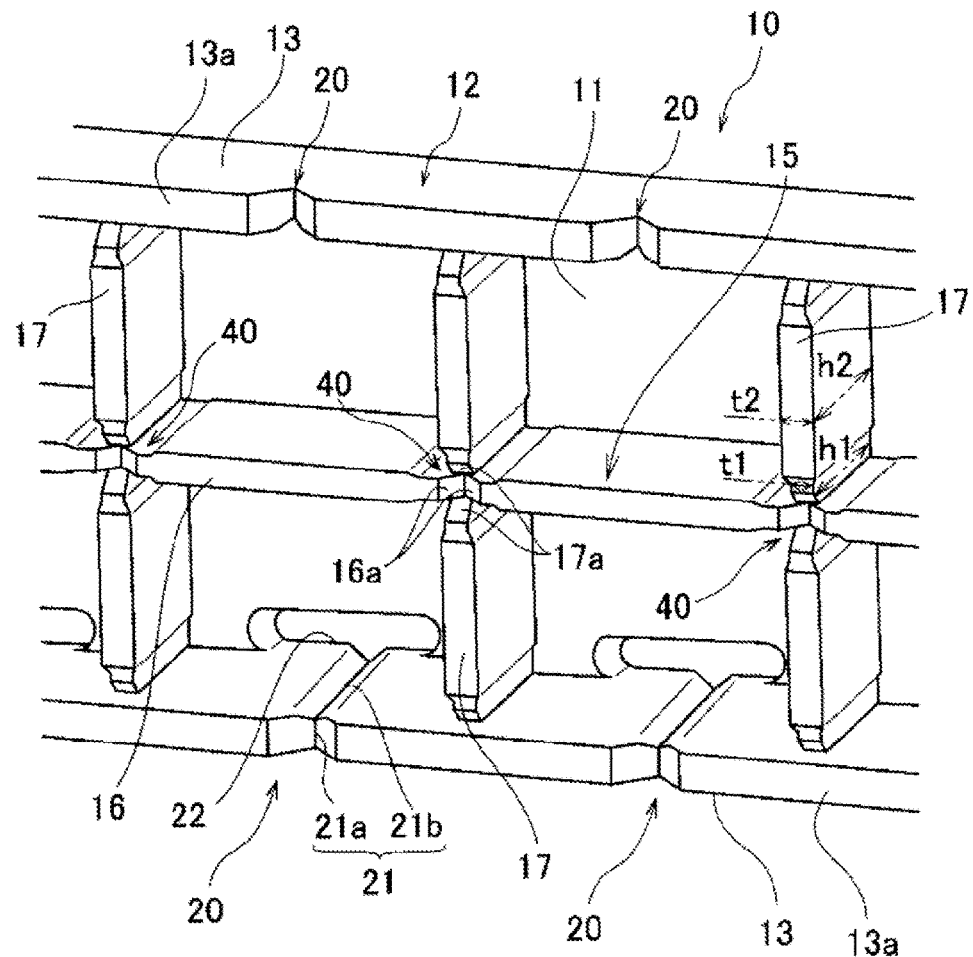
FIG. 4 is an enlarged perspective view of a main part of the damping pad of FIG. 3.
Figure 5:
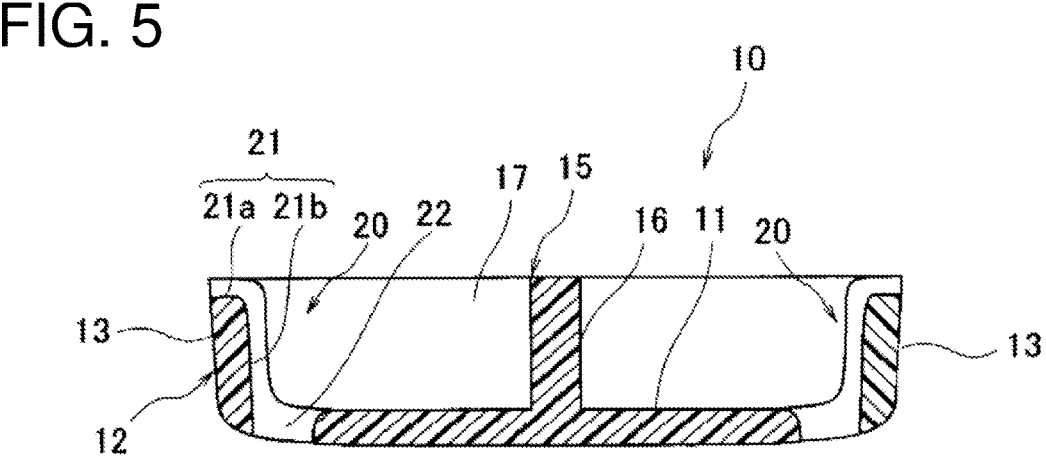
FIG. 5 is a sectional view of the damping pad at line A-A in FIG. 3.

FIG. 4 is an enlarged perspective view of a main part of the damping pad 10 illustrated in FIG. 3. FIG. 5 is a sectional view of the damping pad 10 at line A-A in FIG. 3. The first fragile section 20 is arranged between the adjacent second ribs 17 so that strength of the first vertical wall 13 is locally reduced. Each first fragile section 20 is arranged between the second ribs 17 that are adjacently arranged in parallel. Each first fragile section 20 includes a groove 21 and a slit 22.

The groove 21 is formed at the first vertical wall 13 at a position corresponding to a midpoint between the adjacent second ribs 17. The groove 21 includes a first groove 21a formed at a leading end 13a of the first vertical wall 13 as extending in a thickness direction of the first vertical wall 13, and a second groove 21b formed to communicate with the first groove 21a as linearly extending in a height direction of the first vertical wall 13. Each of the grooves 21a, 21b is formed, for example, into a V-shape, but may be formed into another shape. Further, in the present embodiment, the second groove 21b is formed on the inner side of the first vertical wall 13. However, the second groove 21b may be formed on the outer side of the first vertical wall 13.

The slit 22 is formed at the base plate portion 11 at a position corresponding to a midpoint between the adjacent second ribs 17. Specifically, the slit 22 has an opening shape elongated along the extending direction of the first vertical wall 13 as being in contact with the first vertical wall 13. Owing to existence of the slit 22, the vertical wall 13 is arranged with a base end part thereof separated from the base plate portion 11.

Figure 6:
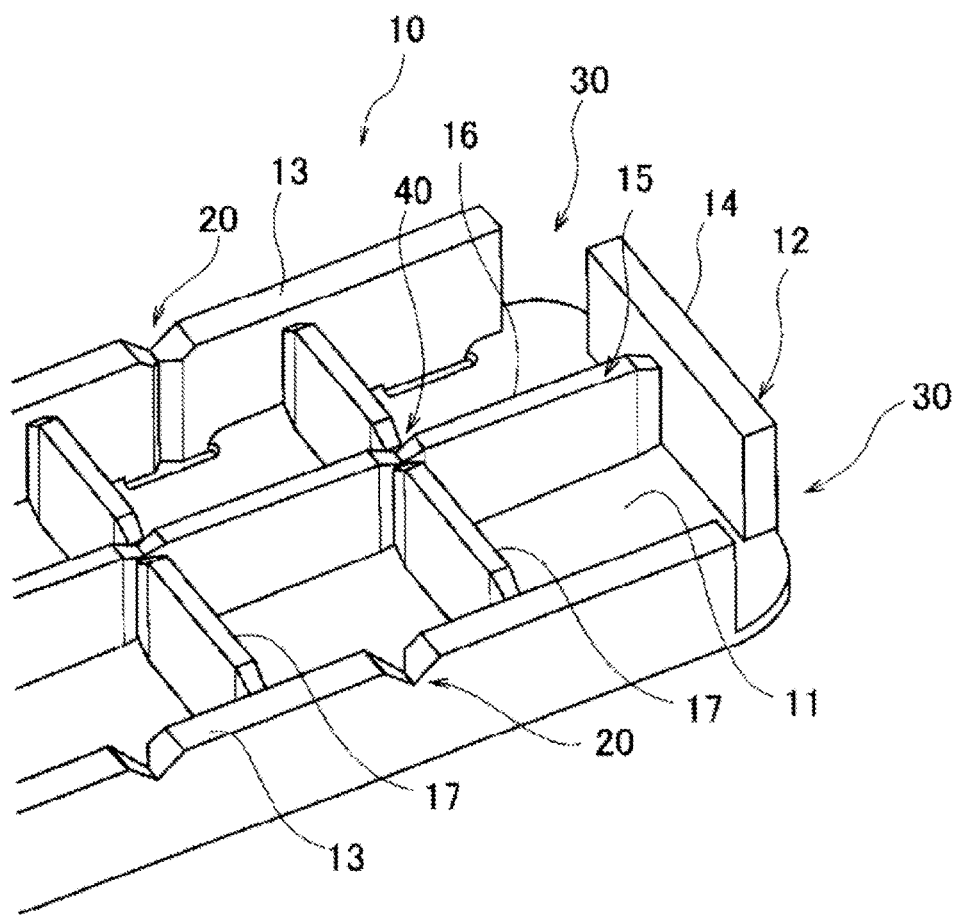
FIG. 6 is an enlarged perspective view of an end part of the damping pad of FIG. 3.

FIG. 6 is an enlarged perspective view of an end part of the damping pad 10 of FIG. 3. The second fragile section 30 is arranged at a corner part of the vertical wall 12, that is, at a connecting part of the first vertical wall 13 and the second vertical wall 14, so that strength of the vertical wall 12 is reduced. Specifically, the second fragile section 30 is formed by a cutout at the connecting part (the corner part) of the first vertical wall 13 and the second vertical wall 14 and is formed at each of four corners of the base plate portion 11.

Further, the third fragile section 40 is arranged at each intersection point of the lattice-like-arranged ribs 15, that is, each intersection point where the first rib 16 and the second rib 17 intersect with each other so that strength of the ribs 15 is locally reduced. As illustrated in FIG. 4, inclined sections 16a, 17a inclined downward toward each intersection point are arranged at sections of the ribs 16, 17 connected to each intersection point. Accordingly, height h1 of the ribs 16, 17 at the intersection points is set lower than height h2 of the ribs 16, 17 at normal sections. Further, thickness t1 of the ribs 16, 17 at the intersection points is set thinner than thickness t2 of the ribs 16, 17 at the normal sections.

As illustrated in FIGS. 1 and 2, the damping pad 10 having the abovementioned configuration is arranged in the space section between the roof panel 2 and the roof trim 4 with the longitudinal direction of the damping pad 10 matched with the vehicle lateral direction. In this case, the damping pad 10 is attached to the roof trim 4 with the base plate portion 11 being in contact with a back face of the roof trim 4. Accordingly, the damping pad 10 is arranged in the space section with the leading end side of the vertical wall 12 and the ribs 15 faced to the roof panel 2.

Examples of a method to attach the damping pad 10 to the roof trim 4 include adhering to the roof trim 4 with a hot-melt adhesive. Further, in view of preventing noise occurrence caused by contacting between the roof panel 2 and the damping pad 10, a sheet such as non-woven fabric may be arranged at appropriate positions to cover the leading end side of the vertical wall 12.

In a vehicle structure (vehicle roof structure) provided with the damping pad 10, when a load F is applied to the roof trim 4 from a vehicle interior side, the input load F is received by the base plate portion 11 of the damping pad 10 arranged on the back face side of the roof trim 4. Accordingly, when the damping pad 10 is moved toward the roof panel 2, leading ends of the vertical wall 12 and the ribs 15 are bumped to the roof panel 2, so that the load F is applied to the vertical wall 12 and the ribs 15 along the height direction of the damping pad 10.

Then, cracks occur in the vertical wall 12 and the ribs 15 at positions corresponding to the fragile sections 20, 40, so that the vertical wall 12 and the ribs 15 are appropriately crushed. Thus, the input energy is absorbed.

Since grooves 21 are formed at the first vertical walls 13, cracks occur at the first vertical walls 13 triggered by the fragile grooves 21. Further, since slits 22 are formed at positions corresponding to the grooves 21 to separate the base end parts of the first vertical walls 13 from the base plate portion 11, fissures are apt to occur along the height direction of the first vertical walls 13 and cracks are easily promoted to proceed. Owing to such cracks, crushing of the first vertical walls 13 occurs tidily and the input energy may be absorbed efficiently. Thus, according to structure of the present embodiment, since occurrence of cracks may be easily prompted, input energy is efficiently absorbed even with the damping pad 10 having a small dimension in the height direction.

Further, each first fragile section 20 is arranged between the second ribs 17 that are adjacently arranged in parallel. Accordingly, when crack occurs at any one of the first fragile sections 20 and the first vertical wall 13 is crushed thereat, crushing is spread toward other first fragile sections 20, so that cracks are promoted at the first vertical wall 13. Accordingly, since crushing occurs at the entire first vertical walls 13, input energy may be efficiently absorbed.

Further, since occurrence of cracks at the first vertical walls 13 is triggered by the grooves 21, a crush state of the damping pad 10 may be controlled. Accordingly, since the first vertical walls 13 and the ribs 15 may be prevented from being overlapped at the time of deformation by crush, the damping pad 10 may be suppressed from having uncrushed sections remain.

Further, the second fragile sections 30 are formed at the damping pad 10 by forming cutouts at the corners of the vertical wall 12. Accordingly, the vertical wall 12 is easily deformed by crush at the vicinities of the corners, so that crushing proceeds over the entire vertical wall 12. Thus, input energy may be efficiently absorbed.

In addition, the third fragile sections 40 are formed at the damping pad 10 by setting lower the height h1 at the intersection points of the ribs 16, 17 than the height h2 at the normal sections thereof. Accordingly, cracks easily occur at the intersection points of the ribs 16, 17, so that the ribs 16, 17 are easily deformed by crush. Thus, since the ribs 16, 17 are appropriately crushed, input energy may be efficiently absorbed.

As described above, the damping pad 10 of the present embodiment includes the first fragile sections 20 each formed between adjacent second ribs 17 to locally reduce strength of the first vertical walls 13. Then, each first fragile section 20 includes the groove 21 formed at the first vertical wall 13 and the slit 22 formed at the base plate portion 11.

According to the above configuration, since the grooves 21 are formed at the first vertical walls 13, cracks occur at the first vertical walls 13 along the fragile grooves 21. Further, the slits 22 are formed at the base plate portion 11 and the base end parts of the first vertical walls 13 are separated from the base plate portion 11. Accordingly, fissures are apt to occur along the height direction of the first vertical walls 13 and occurrence of cracks is facilitated. Consequently, crushing of the first vertical walls 13 occurs tidily and the input energy may be absorbed efficiently.

In other words, since the groove 21 (i.e., the first groove 21a and the second groove 21b) and the slit 22 configuring each first fragile section 20 are formed in a continued state (connected state), one end part of the groove 21 of the first vertical wall 13 is not in contact with the base plate portion 11. Accordingly, since the end part of the first vertical wall 13 in the vicinity of the groove 21 is in a free from the base plate portion 11, crushing of the first vertical wall 13 occurs effectively.

In the present embodiment, the groove 21 includes the first groove 21a extending in the thickness direction and the second groove 21b linearly extending in the height direction. However, the groove 21 may be formed only of the first groove 21a.

Further, although the first fragile section 20 is formed at the first vertical wall 13 in the present embodiment, the first fragile section 20 may be formed at the first rib 16 between the adjacent second ribs 17. Further, in the case that a plurality of the first ribs 16 are arranged, the first fragile section 20 may be formed at the second vertical wall 14. Here, when the number of locations of the first fragile sections 20 is increased, stiffness of the damping pad 10 is decreased as a whole and a deformation reaction force of the damping pad 10 is decreased as well. Therefore, it is preferable to form the first fragile sections 20 in accordance with a desired reaction force.

Further, it is also possible to form the third fragile sections 40 at connection points between the vertical wall 12 and each of the ribs 15.

In the above, description has been provided on the damping pad as a damping member for a vehicle according to an embodiment of the present invention. Naturally, not limited to the embodiment described above, the present invention may be modified variously within the scope of the present invention.

For example, although the damping member for a vehicle is adopted to a roof portion of a vehicle in the present embodiment, the damping member for a vehicle may be widely adopted to a space section between a vehicle body panel and a trim member.

Further, a vehicle structure including the damping member for a vehicle serves as a part of the present disclosure.

REFERENCE SIGNS LIST

1: Roof portion
2: Roof panel
4: Roof trim
10: Damping pad
11: Base plate portion
12: Vertical wall
13: First vertical wall
14: Second vertical wall
15: Rib
16: First rib
17: Second rib
20: First fragile section 21: Groove
21a: First groove
21b: Second groove
22: Slit
30: Second fragile section
40: Third fragile section

The invention claimed is:

1. A damping member for a vehicle arranged at a back face of a trim member attached to cover a vehicle body panel, and configured to absorb input energy of an input load and deformed by crush, the damping member for a vehicle comprising:
  a base plate portion having a flat plate shape;
  a vertical wall arranged at a rim of the base plate portion in a flange-like manner;
  a plurality of ribs arranged in parallel as rising from the base plate portion, each of the ribs connected to the vertical wall as extending in a direction intersecting with the vertical wall; and
  a fragile section having strength of the vertical wall locally reduced, the fragile section arranged between adjacent two of the ribs, the fragile section including,
    a groove formed at the vertical wall, and
    a slit formed at the base plate portion,
  wherein the groove includes,
    a first groove formed at a leading end part of the vertical wall, the first groove extending in a thickness direction of the vertical wall, and
    a second groove communicating with the first groove, the second groove extending in a height direction of the vertical wall, and
  the slit has an opening shape elongated along an extending direction of the vertical wall, the slit being in contact with the vertical wall.

2. The damping member for a vehicle according to claim 1,
  wherein the base plate portion has an approximately rectangular shape having longer side in a vehicle lateral direction,
  the vertical wall is arranged at the entire rim of the base plate portion, and
  the vertical wall has partially cut out portions at four corners of the base plate portion.

3. A damping member for a vehicle arranged at a back face of a trim member attached to cover a vehicle body panel, and configured to absorb input energy of an input load and deformed by crush, the damping member for a vehicle comprising:
  a base plate portion having a flat plate shape;
  a vertical wall arranged at a rim of the base plate portion in a flange-like manner;
  a plurality of ribs arranged in parallel as rising from the base plate portion, each of the ribs connected to the vertical wall as extending in a direction intersecting with the vertical wall; and
  a fragile section having strength of the vertical wall locally reduced, the fragile section arranged between adjacent two of the ribs, the fragile section including,
    a groove formed at the vertical wall, and
    a slit formed at the base plate portion,
  wherein the base plate portion has an approximately rectangular shape having longer side in a vehicle lateral direction,
  the vertical wall is arranged at the entire rim of the base plate portion, and
  the vertical wall has partially cut out portions at four corners of the base plate portion.

* * * * *